United States Patent [19]

Kidd

[11] Patent Number: 5,045,522

[45] Date of Patent: Sep. 3, 1991

[54] ABSORPTION COMPOSITION COMPRISING ZINC TITANATE FOR REMOVAL OF HYDROGEN SULFIDE FROM FLUID STREAMS

[75] Inventor: Dennis R. Kidd, Dewey, Okla.

[73] Assignee: Phillips Petroleum Company, Bartlesville, Okla.

[21] Appl. No.: 499,847

[22] Filed: Mar. 27, 1990

[51] Int. Cl.$^5$ ................... B01J 21/08; B01J 20/12; C01B 17/16; C01B 31/20

[52] U.S. Cl. ........................... 502/405; 55/73; 423/230; 502/237; 502/238; 502/406; 502/407; 502/415

[58] Field of Search ............... 502/405, 406, 407, 415, 502/235, 236, 351, 237, 238

[56] References Cited

U.S. PATENT DOCUMENTS

| | | | |
|---|---|---|---|
| 3,993,590 | 11/1976 | André et al. | 502/8 |
| 4,287,050 | 9/1981 | Eastman et al. | 208/215 |
| 4,313,820 | 2/1982 | Farha, Jr. et al. | 423/230 |
| 4,324,647 | 4/1982 | Gardner | 208/215 |
| 4,376,698 | 3/1983 | Gardner et al. | 208/215 |
| 4,522,709 | 6/1985 | Aldag, Jr. et al. | 208/216 |
| 4,576,925 | 3/1986 | Alkhazov et al. | 502/307 |
| 4,655,906 | 4/1987 | Bjornson et al. | 502/351 |
| 4,725,415 | 2/1988 | Kidd | 423/230 |

*Primary Examiner*—Paul E. Konopka
*Attorney, Agent, or Firm*—Charles W. Stewart

[57] ABSTRACT

Hydrogen sulfide is removed from a fluid stream containing hydrogen sulfide by contacting the fluid stream under suitable absorbing conditions with an absorbing composition comprising zinc titanate, alumina and silica promoted with a metal selected from the group consisting of phosphorus, tungsten, molybdenum, metals of Group VIII of the Periodic Table, and mixtures of any two or more thereof. An absorbing composition and a process for producing such absorbing composition are also disclosed.

20 Claims, No Drawings

ABSORPTION COMPOSITION COMPRISING ZINC TITANATE FOR REMOVAL OF HYDROGEN SULFIDE FROM FLUID STREAMS

BACKGROUND OF THE INVENTION

This invention relates to an improved process for selectively removing hydrogen sulfide from gaseous streams. In another aspect this invention relates to an improved composition suitable for use in such process.

The removal of sulfur from fluid streams can be desirable or necessary for a variety of reasons. If the fluid stream is to be burned as a fuel, removal of sulfur from the fluid stream can be necessary to prevent environmental pollution. If the fluid stream is to be processed, removal of the sulfur is often necessary to prevent the poisoning of sulfur sensitive catalysts or to satisfy other process requirements.

A variety of methods are available to remove sulfur from a fluid stream if the sulfur is present as hydrogen sulfide. These methods include using alkaline regents that unselectively absorb all acid gases. Other methods include the use of selective solid absorbants such as zinc oxide and barg iron ore. However, in general, these solid absorbants are not regenerable to their original form and must be discarded when they have become completely sulfided.

U.S. Pat. No. 4,371,728 discloses a composition comprising zinc, titanium and at least one metal promoter which is an effective absorbing composition for hydrogen sulfide and which possesses the property of being regenerable to the original absorbing composition state in the presence of oxygen when fully sulfided. Further improvements have been made upon the absorption composition of U.S. Pat. No. 4,371,728 and are disclosed in U.S. Pat. No. 4,725,415 where it is disclosed that the addition of alumina, in an amount within the range of about 10 weight percent to about 55 weight percent based upon the combined weight of the zinc, titanium and alumina, to the composition provides a more effective absorbing composition.

The absorption compositions disclosed in U.S. Pat. No. 4,371,728 and 4,725,415 not only solved the earlier problems associated with the use of solid absorbent compounds, which were unregenerable to their original form once they had become sulfided, these compounds were also effective at absorbing large amounts of sulfur that may be contained in a fluid stream while minimizing the amount of sulfur slippage. The amount of sulfur absorbed and retained by an absorbent is sometimes referred to as the sulfur loading of the composition. The sulfur slippage is the amount of sulfur contained in a fluid stream that is to be treated which passes unabsorbed through a bed of the contact material. It is desirable to have an absorbent composition which minimizes the sulfur slippage while simultaneously having a large sulfur loading capacity.

I have found that an absorbing composition comprising zinc titanate, alumina, and silica promoted with a metal selected from the group consisting of phosphorus, tungsten, molybdenum, metals of Group VIII of the Periodic Table and mixtures of any two or more thereof has substantially improved absorption properties. This improved composition has greater sulfur loading capacities over those of the prior art compositions. Moreover, the novel composition provides further reductions in the amount of sulfur slippage into a treated effluent stream.

It is thus an object of this invention to provide an improved process for removing hydrogen sulfide from fluid streams. It is a further object of this invention to provide an improved removal or absorbing composition which possesses the property of being regenerable to the original absorbing composition state in the presence of oxygen when fully sulfided. A still further object of the present invention is to provide an improved regenerable absorption composition with greater sulfur loading capabilities and which minimizes the amount of sulfur slippage into a treated effluent stream.

SUMMARY OF THE INVENTION

In accordance with the present invention, an absorption composition comprising zinc titanate, alumina, and silica promoted with a metal selected from the group consisting of phosphorus, tungsten, molybdenum, metals of Group VIII of the Periodic Table and mixtures of any two or more thereof has been developed which has improved absorption properties. In another aspect of the invention, the absorption composition is utilized in a process to selectively remove hydrogen sulfide from a fluid stream containing hydrogen sulfide.

Other objects and advantages of the invention will be apparent from the foregoing description of the invention and the appended claims as well as from the detailed description of the invention which follows.

DETAILED DESCRIPTION OF THE INVENTION

In the process of the present invention it is believed that the hydrogen sulfide is being absorbed by the absorbing composition and thus the terms "absorption process" and "absorbing composition" are utilized for the sake of convenience. However, the exact chemical phenomenon occurring is not the inventive feature of the process of the present invention and the use of the term "absorb" in any form is not intended to limit the present invention.

The selective absorption process is preferably carried out in cycles comprising an absorption period and a regeneration period for the absorbing composition. The absorption period comprises contacting a gaseous stream which contains hydrogen sulfide with the absorbing composition to thereby selectively remove hydrogen sulfide from the gaseous stream. The absorbing composition becomes sulfided during the absorption period. When the absorbing composition becomes sulfided to the point that regeneration is desirable, preferably when it is nearly completely sulfided, a gas containing molecular oxygen is passed in contact with the absorbing composition to regenerate the absorbing composition and convert the absorbed sulfur to an oxide.

The chemical changes that are believed to occur in the absorbing composition during this cyclic process where sulfur is present are summarized in the following equations:

$$Zn_2TiO_4 + 2H_2S \rightarrow 2ZnS + TiO_2 + 2H_2O \quad \text{(I)}$$

$$ZnS + Oxygen \rightarrow ZnO + SO_x \quad \text{(II)}$$

$$2ZnO + TiO_2 \rightarrow Zn_2TiO_4 \quad \text{(III)}$$

The absorbing composition of the present invention can be utilized to remove hydrogen sulfide from any suitable gaseous stream. The hdyrogen sulfide can be produced by the hydrodesulfurization of organic sulfur compounds or can be originally present in the gaseous stream as hydrogen sulfide. Suitable gaseous streams include light hydrocarbons such as methane, ethane and natural gas; gases derived from petroleum products and products from extraction and/or liquefaction of coal and lignite; gases derived from tar sands and shale oil; coal derived synthesis gas; gases such as hydrogen and nitrogen; gaseous oxides of carbon; steam and the inert gases such as helium and argon. Gases that adversely affect the removal of hydrogen sulfide and which should be absent from the gaseous streams being processed are oxidizing agents such as molecular oxygen, the halogens, the oxides of nitrogen, and the like.

The absorbing composition of the present invention can be utilized to reduce the concentration of hydrogen sulfide in a fluid stream to any suitable amount. The concentration of hydrogen sulfide in a fluid stream will generally be reduced to below about 100 ppm and will more preferably be reduced to below about 10 ppm.

The absorbing composition employed in the process of the present invention is a composition comprising zinc titanate, alumina, silica and a promoter metal selected from the group consisting of phosphorus, tungsten, molybdenum, Group VIII metals of the Periodic Table and mixtures of any two or more thereof. As used herein, the term Group VIII metals from the Periodic Table, or similar language, specifically includes iron, cobalt, nickel, ruthenium, rhodium, palladium, osmium, iridium and platinum. The promoter metals selected from the group consisting of molybdenum, tungsten, Group VIII metals of the Periodic Table and mixtures of any two or more thereof, can be present in the absorbing composition as oxides, sulfides or as free elements.

The absorption composition of the present invention can be prepared by any suitable method known in the art. The absorption composition is generally a hydrogel derived compound comprising zinc titanate, alumina, and silica promoted with a metal selected from phosphorus, tungsten, molybdenum, Group VIII metals from the Periodic Table, and mixtures of any two or more thereof. In general, the composition is manufactured by first preparing the zinc titanate which is then reduced to a small size. The resulting material is mixed with a silicated alumina hydrosol formed by mixing an alumina hydrosol with a sodium silicate solution to form a hydrogel. The resulting hydrogel is washed to remove sodium and then dried slowly followed by calcination to form a hydrogel derived absorbing composition of zinc titanate, alumina and silica.

The promoter metals selected from the group consisting of phosphorus, tungsten, molybdenum, a Group VIII metals from the Periodic Table and mixtures of any two or more thereof, are then added to the hydrogel derived absorbing composition of zinc titanate, alumina and silica. The promoters may be added separately or in the form of a metal tungstate or metal molybdate.

The zinc titanate portion of the absorbing composition can be prepared by intimately mixing suitable portions of zinc oxide and titanium dioxide, preferably in a liquid such as water, and calcining the mixture in the presence of free oxygen at a temperature in the range of from about 650° C. to about 1050° C., preferably in the range of from about 675° C. to about 975° C., to form zinc titanate. A calcining temperature in the range of from about 800° C. to about 850° C. is most preferred because the surface area of the zinc titanate is maximized in this temperature range, thus producing a more active zinc titanate. The titanium dioxide used in preparing the zinc titanate preferably has extremely fine particle size to promote intimate mixing of the zinc oxide and titanium dioxide. This produces a rapid reaction of the zinc oxide and titanium dioxide which results in a more active zinc titanate. Preferably the titanium dioxide has an average particle size of less than 100 millimicrons and more preferably less than 30 millimicrons. Flame hydrolyzed titanium dioxide has extremely small particle size and is particularly preferred in preparing the zinc titanate. The atomic ratio of zinc to titanium can be any suitable ratio. The atomic ratio of zinc to titanium will generally lie in the range of from about 1:1 to about 3:1 and will preferably lie in the range of from about 1.8:1 to about 2.2:1 because the activity of the zinc titanate is greatest for atomic ratios of zinc to titanium in this range. The term "zinc titanate" is used regardless of the atomic ratio of zinc to titanium.

The zinc titanate portion of the absorbing composition can also be prepared by coprecipitation from aqueous solutions of a zinc compound and a titanium compound. The aqueous solutions are mixed together and the hydroxides are precipitated by the addition of ammonium hydroxide. The precipitate is then washed, dried and calcined, as described in the preceding paragraph, to form zinc titanate. This method of preparation is less preferred than the mixing method because the zinc titanate prepared by the coprecipitation method is softer than the zinc titanate prepared by the mixing method.

The resulting zinc titanate can be reduced to a suitable size for mixing with a silicated alumina hydrosol by any suitable method such as treatment in an ultrasonic disrupter. The zinc titanate can be reduced to any suitable size with a particle size in the range of from about 1.0 to about 10 microns being preferred.

The resulting zinc titanate, having a fine particle size, is mixed with a silicated alumina hydrosol to form a hydrogel. To prepare the hydrogel, an alumina hydrosol is first prepared for mixing with a sodium silicate solution. The alumina hydrosol is first prepared by adding to an aqueous slurry of alumina hydrate, which may also be referred to as boehmite, aluminum oxyhydroxide or by various commercial tradename equivalents, as acid solution. Any suitable acid can be used; however, the preferred acid is nitric acid. The alumina hydrosol is then mixed with a sodium silicate solution at which time the dispersed alumina and silica undergo various reactions to form a silicated alumina hydrosol. The resulting silicated alumina hydrosol is then thoroughly mixed with a slurry of zinc titanate.

After the zinc titanate has been thoroughly mixed into the silicated alumina hydrosol, a suitable base is added to convert the resulting hydrosol to a hydrogel. Any suitable base such as alkali metal hydroxides, ammonium hydroxide, or urea can be utilized. Ammonium hydroxide is the preferred base because it does not have any metallic component that would remain in the hydrogel.

The resulting hydrogel is dried slowly so that water will not be removed so rapidly that the hydrogel structure will collapse which would result in an excessive loss of pore volume and surface area in the finished hydrogel derived absorbing composition. Any suitable drying time can be utilized which does not result in too rapid removal of water. Preferably, the drying time is in the range of about 8 hours to about 24 hours.

Any suitable temperature can be utilized for the drying of the zinc titanate and silicated alumina hydrogel but again the temperature should be such that too rapid a removal of water does not result. The drying temperature is preferably in the range of from about 35° C. to about 150° C. The most preferred drying condition is to start the drying process at about 80° C. and increase the temperature slowly to about 120° C. during the drying time.

After the zinc titanate and silicated alumina hydrogel has been dried, it is then calcined in the presence of free oxygen to form the hydrogel derived absorbing composition. Any suitable free oxygen-containing gas can be utilized, with air being preferred because of its availability. Also, any suitable time and temperature for calcining can be utilized, with a preferred time being about two hours and a preferred temperature being in the range of from about 425° C. to about 750° C. and more preferably in the range of from about 480° C. to about 700° C. Although the dried zinc titanate and silicated alumina hydrogel can be placed directly into a preheated furnace or kiln for calcining, it is preferably for the hydrogel to attain its final temperature during a heating period of about two hours.

In accordance with this invention, the hydrogel derived absorbing composition of zinc titanate, alumina and silica can contain any suitable amount of alumina. In general, the amount of alumina in the hydrogel derived absorbing composition will be in the range of from about 10 weight percent to about 50 weight percent based upon the total combined weight of the zinc titanate, alumina, and silica and will more preferably be in the range of from about 30 weight percent to about 40 weight percent based upon the total combined weight of the zinc titanate, alumina and silica. As for the concentration of silica in the absorbing composition, it should range from upwardly to about 30 weight percent as long as there is some silica present in the composition. A preferred range for the silica composition is from about 5 weight percent to about 15 weight percent. The zinc titanate concentration, which provides the chemical compound that gives the absorption composition its chemi-absorption properties, can be in the range of from about 30 weight percent to about 70 weight percent; but, preferably the concentration can range from about 50 weight percent to about 60 weight percent based on the total weight of the zinc titanate, alumina, and silica.

The absorbing composition of the present invention is promoted with any suitable promoter. Preferred promoters include, but are not limited to, metals selected from the group consisting of phosphorus, tungsten, molybdenum, Group VIII metals of the Periodic Table, and mixtures of two or more thereof. The most preferred promoter includes a mixture of nickel, molybdenum and phosphate. The promoters and promoter metals can be added to the absorbing composition either in their elemental form or in the form of suitable compounds.

Molybdenum compounds suitable for use as a promoter metal are ammonium molybdate, potassium molybdate, molybdenum oxides such as molybdenum (IV) oxide and molybdenum (VI) oxide and the like and mixtures of any two or more thereof.

Tungsten compounds suitable for use as a promoter metal are ammonium tungstate, potassium tungstate, tungsten oxides such as tungsten (IV) oxide and tungsten (VI) oxide and the like and mixtures of any two or more thereof.

Other metal compounds suitable for use as a promoter metal are metal acetates, metal carbonates, metal nitrates, metal oxides, metal sulfates, metal thiocyanates, and the like, and mixtures of any two or more thereof, wherein the metals are selected from Group VIII of the Periodic Table.

The promoters or promoter metals, or both, can be added to the absorbing composition by any method known in the art. The promoters or promoter metals can be added individually by impregnating the hydrogel with a solution, either aqueous or organic, that contains a promoting element. After the promoter or promoter metal, or both, has been added to the hydrogel, the hydrogel is dried to remove essentially all of the solvent.

After drying the impregnated hydrogel, a solution of another promoter or promoter metal, or both, can be added by impregnation. The sequence in which the promoting elements are added is immaterial.

After the promoters or promoter metals, or both, have been added, the absorbing composition is calcined in the presence of oxygen at a temperature in the range of from about 500° to about 650° C. until volatile matter is removed and the promoting elements are substantially converted to their oxides. The time required for calcining step can range from about 0.1 to about 10 hours.

The processes of the present invention can be carried out by means of any apparatus whereby there is achieved an alternate contact of the absorbing composition with the gaseous feed stream and thereafter of the absorbing composition with a gas containing molecular oxygen which is utilized to regenerate the absorbing composition. The process is in no way limited to the use of a particular apparatus. The process of this invention can be carried out using a fixed absorbing composition bed, fluidized absorbing composition bed or moving absorbing composition bed. Presently preferred is a fixed absorbing composition bed.

In order to avoid any casual mixing of the gaseous feed stream containing hydrogen sulfide with the oxygen-containing gas utilized in the regeneration step, provision is preferably made for terminating the flow of the gaseous feed stream to the reactor and subsequently injecting an inert purging fluid such as nitrogen, carbon dioxide or steam. Any suitable purge time can be utilized but the purge should be continued until all hydrocarbon or hydrogen, or both, are removed. Any suitable flow rate of the purge fluid can be utilized. Presently preferred is a purge fluid flow rate in the range of about 800 GHSV to about 1200 GHSV.

Any suitable absorbing temperature for the processes of the present invention can be utilized. The absorbing temperature will generally be in the range of from about 150° C. to about 650° C. and will more preferably be in the range of from about 250° C. to about 500° C.

Any suitable temperature can be utilized to regenerate the absorbing composition from its sulfided form back to the original absorbing composition form. The regeneration temperature will generally be in the range of from about 370° C. to about 815° C. A regeneration temperature of at least 540° C. is presently preferred to effect the regeneration within a reasonable time.

Any suitable absorbing pressure for the processes of the present invention can be utilized. The pressure of the gaseous feed stream being treated is not believed to have an important effect on the absorption process of the present invention. The absorbing pressure will generally be in the range of from about atmospheric to at least about 2,000 psig during the treatment.

Any suitable residence time for the gaseous feed stream in the presence of the absorbing composition of the present invention can be utilized. The residence time expressed as volumes of gas at standard temperature and pressure per volume of absorbing composition per hour will generally be in the range of from about 10 to about 10,000 and will more preferably be in the range of from about 250 to about 2500.

When the absorbing composition is completely sulfided it will no longer combine with the hydrogen sulfide in the manner set forth in equation (I). When this condition occurs, hydrogen sulfide will begin to appear in the effluent flowing from the reaction and this will be an indication that the absorbing composition should preferably be regenerated. The time required for the absorbing composition to become completely sulfided will generally be a function of the concentration of sulfur in the feedstock and feed rate employed.

When the absorbing composition becomes substantially completely sulfided, the absorbing composition is typically regenerated by terminating the flow of feed to the reactor and purging with an inert fluid such as nitrogen to remove any combustibles. A free oxygen-containing gas is then introduced to oxidize the zinc sulfide in accordance with equation (II). Also at the temperature at which the oxidation of the zinc sulfide is effected, the zinc oxide thus produced recombines with the titanium dioxide to resynthesize the original zinc titanate in accordance with equation (III).

The amount of oxygen supplied during the regeneration step will generally be in an amount sufficient to at least substantially remove sulfur from the absorbing composition. The regeneration step is conducted at generally about atmospheric pressure.

The following examples are presented in further illustration of the invention.

EXAMPLE I

A zinc titanate and alumina absorbent mixture comprising 50 weight percent alumina and 50 weight percent zinc titanate, based upon the total combined weight of alumina and zinc titanate, along with a promoter mixture of nickel, molybdenum and phosphate was prepared for use in the inventive process as a control case.

The zinc titanate was prepared by combining two moles of zinc oxide with one mole of titanium dioxide in a sufficient amount of water to provide for good contact and mixing for a sufficient amount of time necessary to provide an intimately mixed slurry. The resulting slurry was dried at a temperature range of from about 100° C. to 120° C. and then calcined by heating in air at 800° C. for about three hours. After cooling, the calcined solid was crushed and screened. A mono hydrated alumina, or boehmite, slurry mixture of 1000 ml of water and 115 grams of hydrated alumina was mixed with 10 ml of nitric acid ($HNO_3$) to peptized the alumina. After stirring the mixture for a sufficient time period to promote intimate mixing, 115 grams of the crush and screened zinc titanate was intimately mixed with the alumina and nitric acid hydrosol. Upon the completion of intimate mixing of the solution, 10 ml of ammonium hydroxide ($NH_4OH$) was added to form a hydrogel. The hydrogel was then transferred to an evaporating dish in which it was dried at a temperature in a range of from about 75° C. to about 120° C. for two days. The drying of the hydrogel was followed by calcination of the hydrogel for 2 hours at a temperature range of from about 24° C. to about 500° C. and for 3 hours at a temperature of about 500° C.

To add the nickel, molybdenum and phosphorous promoter mixture to the hydrogel, a standard incipient wetness procedure, which will hereinafter be described, was followed. The dried and calcined hydrogel was crushed to a 14/40 mesh size and impregnated with a nickel, molybdenum and phosphate aqueous stock solution by incipient wetness to give a concentration, based on the total combined weight of hydrogel, of 7.2 weight percent molybdenum, 1.7 weight percent nickel and 0.5 weight percent phosphorus. The stock solution of nickel, molybdenum and phosphate aqueous solution was made by preparing a mixture of 16.4 grams nickel carbonate ($NiCO_3$), 51.0 grams molybdenum oxide ($MoO_3$), 9.8 grams phosphoric acid and 80 ml water. Once the components were mixed together, the solution was boiled under total reflux conditions for a time period sufficient to allow the completion of the chemical reactions. The thus prepared stock solution used for the impregnation of the hydrogel was then diluted with a volume of water equal to the total pore volume of the material being impregnated. The stock solution contained $5.4 \times 10^{-2}$ grams nickel per grams solution, $2.3 \times 10^{-1}$ grams molybdenum per grams solution, and $1.7 \times 10^{-2}$ grams phosphorus per grams solution. The solid hydrogel was mixed with the diluted stock solution and stirred with agitation so that the solution was uniformly mixed with the solids. The impregnated hydrogel was then dried for a two day period in a forced air dryer at a temperature of about 120° C. The drying step was followed by calcination for 2 hours in the temperature range of from about 100° C. to about 400° C. and for 3 hours at a temperature of about 400° C. to produce are absorbing composition.

EXAMPLE II

The inventive absorbent mixture comprising 55 weight percent zinc titanate, 34 weight percent alumina, and 11 weight percent silica, based upon the total combined weight of zinc titanate, alumina and silica, along with a promoter mixture of nickel, molybdenum and phosphate was prepared for use in the inventive process.

A slurry mixture comprising 1000 ml of water and 47.92 grams hydrated alumina (Catapal D manufactured by Vista Corporation) was mixed with 10 ml of concentrated nitric acid ($HNO_3$) to form an alumina hydrosol. To form a silicated alumina hydrosol, there was mixed with the alumina hydrosol an acidic aqueous solution of sodium silicate comprising 44.31 grams of sodium silicate. Once a silicated alumina hydrosol was formed, a slurry of zinc titanate was then added and mixed with 100 ml of concentrated ammonium hydroxide ($NH_4OH$) to form a hydrogel having the composition of 55 weight percent zinc titanate, 34 weight percent alumina, and 11 weight percent silica, based on the total combined weight of alumina, zinc titanate and silica.

To remove trace quantities of the sodium cations, the hydrogel was subjected to a series of four wash steps using ammonium nitrite ($NH_4NO_3$) for the first wash followed by the use of ammonium hydroxide for the second, third and fourth washes. The washed hydrogel composition was then dried for 24 hours at a temperature of 120° C. followed by a calcination step for 3 hours at 500° C.

The dried and calcined hydrogel comprising zinc titanate, alumina and silica was ground to a 10/35 mesh size and impregnated with a nickel, molybdenum, and phosphate aqueous solution by incipient wetness to give a concentration, based upon the total combined weight of the hydrogel, of 7.2 weight percent molybdenum, 1.7 weight percent nickel and 0.5 weight percent phosphorus. Following the impregnation step, the hydrogel was then dried for 3 hours at 120° C. in a forced air oven. After the impregnated hydrogel was dried, it was calcined at a temperature of 500° C. for a period of 3 hours to produce an absorbing composition.

EXAMPLE III

The process of this invention was carried out using the two absorbing compositions produced in Examples I and II.

A reactor was filled with a 5 cc volume bottom layer of inert quartz chips on top of which was placed a 10 cc volume (approximately 10.54 grams) layer of the particular absorbing composition. The reactor, which was maintained at a pressure of about 1.7 psig, was operated in a fixed bed, downflow mode. Within the reactor, the absorbing composition was heated to the desired operating temperature by an electric furance. During the heating process, the absorbing composition was maintained under a nitrogen flow. When the desired temperature of about 538° C. was attained, the nitrogen flow was stopped, and a simulated sulfur plant gas and, when used, water vapor flows were started. The water vapor was generated by pumping water through a heated line that was connected to the top of the reactor. The reaction was carried out at a reaction temperature of about 538° C. and a gas hourly space velocity of 2050 cc/cc catalyst/hour. The composition of the simulated sulfur plant gas was as follows: 2.1 volume percent hydrogen sulfide, 26.2 volume percent carbon dioxide, and 71.7 volume percent nitrogen.

The absorbing composition was used in a cyclic manner. A complete process cycle consists of a contacting step whereby an $H_2S$ containing stream is brought into contact with the absorption composition and in which chemi-absorption takes place and a regeneration step. Once the chemi-absorption reaction, as can sometimes be evidenced by increases in the amount of $H_2S$ that breaks through the bed of absorbing composition, the fluid stream being treated is discontinued and the absorbing composition is regenerated by passing a gas containing free oxygen in contact with the absorption composition. The oxygen contained in the regeneration gas serves to convert the absorbed sulfur to an oxide compound, and to drive from the absorption material the absorbed sulfur in the form of $SO_x$.

The progress of the absorption was followed by measuring the concentration of hydrogen sulfide in the reactor effluent after the water vapor had been condensed and removed from the effluent. The concentration of hydrogen sulfide or sulfur dioxide, or both, was measured with commercially available Draeger tubes that were suited to the concentration ranges encountered and in accordance with the manufacturer's recommendations.

Once the each absorbing composition became fully sulfided, as evidenced by hydrogen sulfide breakthrough, the flow of the simulated sulfur plant gas to the reactor was halted and the reactor was purged with nitrogen for a period of 20 minutes while being heated to a regeneration temperature of 632° C. The sulfided absorbing composition was then regenerated in the presence of air for about 1.5 hours. following regeneration, the reactor was again purged with nitrogen for 40 minutes while being cooled back down to the reaction temperature of 538° C. The nitrogen purge was then halted and the simulated sulfur plant gas was fed to the reactor to begin another absorption cycle.

This example illustrates the use of the absorbing composition prepared in the manner described in Examples I and II for the removal of $H_2S$ from a simulated sulfur plant gas stream. The results are presented as a function of the amount of hydrogen sulfide present in the treated effluent gaseous stream (measured in ppm) at the time of the reading. The cycle number listed is the number of the absorption cycle in which the reading was taken during an ongoing test comprising repeated cycles of absorption and regeneration. The test results are summarized in Tables I and II.

TABLE I

Process Using Inventive Composition Comprising 55 Weight Percent Zinc Titanate. 34 Weight Percent Alumina and 11 Percent Silica Promoted With 7.2 Weight Percent Molybdenum. 1.7 Weight Percent Nickel and 0.5 Weight Percent Phosphorous

| Cycle (#) | Time Into the Absorption Step of Indicated Cycle (Min) | $H_2S$ in Off-Gas (ppm) | Total Sulfur Loading (%) |
|---|---|---|---|
| 1 | 16 | 0 | 1.6 |
|   | 29.5 | 0 | 2.9 |
| 2 | 27 | 0 | 2.7 |
|   | 40 | 0 | 4.0 |
|   | 45 | 8 | 4.5 |
|   | 55 | 200 | 5.5 |
| 48 | 35 | 0 | 3.5 |
|   | 45 | 3 | 4.5 |
|   | 55 | 14 | 5.5 |
|   | 59 | 280 | 5.9 |
| 148 | 43 | 0 | 4.3 |
|   | 45 | 5 | 4.5 |
|   | 50 | 37 | 5.0 |
|   | 55 | 130 | 5.5 |

TABLE II

Process Using a Control Composition Comprising 50 Weight Percent Zinc Oxide and 50 Weight Percent Alumina Promoted with 7.2 Weight Percent Molybdenum. 1.7 Weight Percent Nickel and 0.5 Weight Percent Phosphorous

| Cycle (#) | Time Into the Absorption Step of Indicated Cycle (Min) | $H_2S$ in Off-Gas (ppm) | Total Sulfur Loading (%) |
|---|---|---|---|
| 1 | 18.0 | 0 | 1.8 |
|   | 28.0 | 15 | 2.8 |
| 30 | 27.5 | 40 | 2.7 |
|   | 29.5 | 200 | 2.9 |
| 50 | 25.5 | 10 | 2.5 |
|   | 27.5 | 70 | 2.7 |
|   | 29.5 | 300 | 2.9 |
| 135 | 21.0 | 2 | 2.1 |
|   | 24.0 | 20 | 2.4 |
|   | 25.5 | 115 | 2.5 |
|   | 27.5 | 390 | 2.7 |

The data presented in Tables I and II show the improvement in absorption performance which will result from utilizing the novel composition. Table I shows that the zinc titanate, alumina and silica absorption mixture significantly and materially reduces the amount of sulfur slippage, which is the amount of hydrogen sulfide that is oxidized to sulfur dioxide during the absorption cycle, over that of the comparative composition of Table II. Furthermore, a comparison of the sulfur loadings set forth in Tables I and II shows that the inventive composition employed in the process of the present invention has a dramatically improved sulfur loading capacity. The data presented clearly establishes the improvements over the prior art that are achievable using the novel composition in the inventive process.

Reasonable variation and modifications are possible within the scope of this disclosure without departing from the scope and spirit thereof.

That which is claimed is:

1. An absorbing composition comprising zinc titanate, alumina, silica and a promoter prepared by calcining a mixture of zinc oxide and titanium dioxide in the presence of free oxygen at a temperature in the range of from about 650° C. to about 1050° C. to form zinc titanate, mixing the thus-formed zinc titanate in a powdered form with a silicated alumina hydrosol to form a mixture, adding ammonium hydroxide to convert said mixture to a hydrogel, drying and thereafter calcining said hydrogel to form a hydrogel derived composition of zinc titanate, alumina, and silica, adding a promoter metal selected from the group consisting of phosphorus, tungsten, molybdenum, metals of Group VIII of the Periodic Table, and mixtures of any two or more thereof to said hydrogel derived composition of zinc titanate, alumina, and silica, and calcining said hydrogel derived composition of zinc titanate, alumina, and silica to which said promoter metal has been added to form said absorbing composition, wherein said promoter metal is present in said hydrogel derived absorbing composition in the oxide form.

2. A composition in accordance with claim 1 wherein said absorbing composition is further calcined in the presence of free oxygen at a temperature in the range of from about 425° C. to about 650° C. for a time of about 2 hours.

3. A composition in accordance with claim 1 wherein said absorbing composition is further calcined in the presence of free oxygen at a temperature in the range of from about 425° C. to about 650° C. for a time in the range of from about 0.1 hours to about 10 hours.

4. A composition in accordance with claim 1 wherein the atomic ratio of zinc to titanium in said absorbing composition is in the range of from about 1:1 to about 3:1.

5. A composition in accordance with claim 4 wherein the atomic ratio of zinc to titanium in said absorbing composition is in the range of from about 1.8:1 to about 2.2:1.

6. An absorbing composition comprising from about 30 to about 70 weight percent zinc titanate, from about 10 to about 50 weight percent alumina, upwardly to about 30 weight percent silica, and from about 2.0 to about 25 weight percent promoter metal wherein weight percent is based upon the total combined weight of the zinc titanate, alumina and silica, and wherein said absorbing composition is prepared by calcining a mixture of zinc oxide and titanium dioxide in the presence of free oxygen at a temperature in the range of from about 650° C. to about 1050° C. to form zinc titanate, mixing the thus-formed zinc titanate in a powdered form with a silicated alumina hydrosol to form a mixture, adding ammonium hydroxide to convert said mixture to a hydrogel, drying and calcining said hydrogel to form a hydrogel derived composition of zinc titanate, alumina, and silica, adding a promoter metal selected from the group consisting of phosphorus, tungsten, molybdenum, metals of Group VIII of the Periodic Table, and mixtures of any two or more thereof to said hydrogel derived composition of zinc titanate, alumina, and silica, and calcining said hydrogel derived composition of zinc titanate, alumina, and silica to which said promoter metal has been added to form said absorbing composition, wherein said promoter metal is present in said hydrogel derived absorbing composition in the oxide form.

7. A composition in accordance with claim 6 wherein said absorbing composition is further calcined in the presence of free oxygen at a temperature in the range of from about 425° C. to about 650° C. for a time of about 2 hours.

8. A composition in accordance with claim 6 wherein said absorbing composition is further calcined in the presence of free oxygen at a temperature in the range of from about 425° C. to about 650° C. for a time in the range of about 0.1 hours to about 10 hours.

9. A composition in accordance with claim 6 wherein the atomic ratio of zinc to titanium in said absorbing composition is in the range of from about 1:1 to about 3:1.

10. A composition in accordance with claim 9 wherein the atomic ratio of zinc to titanium in said absorbing composition is in the range of from about 1.8:1 to about 2.2:1.

11. An absorbing composition comprising from about 50 to about 60 weight percent zinc titanate, from about 30 to about 40 weight percent alumina, from about 5 to about 15 weight percent silica and a promoter metal wherein weight percent is based upon the total combined weight of the zinc titanate, alumina and silica, and wherein said absorbing composition is prepared by calcining a mixture of zinc oxide and titanium dioxide in the presence of free oxygen at a temperature in the range of from about 650° C. to about 1050° C. to form zinc titanate, mixing the thus-formed zinc titanate in a powdered form with a silicated alumina hydrosol to form a mixture, adding ammonium hydroxide to convert said mixture to a hydrogel, drying and calcining said hydrogel to form a hydrogel derived composition of zinc titanate, alumina, and silica, adding a promoter metal selected from the group consisting of phosphorus, tungsten, molybdenum, metals of Group VIII of the Periodic Table, and mixtures of any two or more thereof to said hydrogel derived composition of zinc titanate, alumina, and silica, and calcining said hydrogel derived composition of zinc titanate, alumina, and silica to which said promoter metal has been added to form said absorbing composition, wherein said promoters are present in said hydrogel derived absorbing composition in the oxide form.

12. A composition in accordance with claim 11 wherein said absorbing composition is further calcined in the presence of free oxygen at a temperature in the range of from about 425° C. to about 650° C. for a time of about 2 hours.

13. A composition in accordance with claim 11 wherein said absorbing composition is further calcined in the presence of free oxygen at a temperature in the range of from about 425° C. to about 650° C. for a time in the range of from about 0.1 hours to about 10 hours.

14. A composition in accordance with claim 11 wherein the atomic ratio of zinc to titanium in said absorbing composition is in the range of from about 1:1 to about 3:1.

15. A composition in accordance with claim 14 wherein the atomic ratio of zinc to titanium in said absorbing composition is in the range of from about 1.8:1 to about 2.2:1.

16. An absorbing composition comprising about 55 weight percent zinc titanate, about 34 weight percent alumina, about 11 weight percent silica, and promoter metal comprising about 7.2 weight percent molybdenum, about 1.7 weight percent nickel and about 0.5 weight percent phosphorus wherein weight percent is based on the total combined weight of zinc titanate, alumina and silica, and wherein said absorbing composition is prepared by calcining a mixture of zinc oxide and titanium dioxide in the presence of free oxygen at a temperature in the range of about 650° C. to about 1050° C. to form zinc titanate, mixing the thus-formed zinc titanate in a powdered form with a silicated alumina hydrosol to form a mixture, adding ammonium hydroxide to convert said mixture to a hydrogel, drying and calcining said hydrogel to form a hydrogel derived composition of zinc titanate, alumina, and silica, adding a promoter metal selected from the group consisting of phosphorus, tungsten, molybdenum, metals of Group VIII of the Periodic Table, and mixtures thereof to said hydrogel derived composition of zinc titanate, alumina, and silica, and calcining said hydrogel derived composition of zinc titanate, alumina, and silica to which said promoters have been added to form said absorbing composition, wherein said promoters are present in said hydrogel derived absorbing composition in the oxide form.

17. A composition in accordance with claim 16 wherein said absorbing composition is further calcined in the presence of free oxygen at a temperature in the range of from about 425° C. to about 650° C. for a time of about 2 hours.

18. A composition in accordance with claim 16 wherein said absorbing composition is further calcined in the presence of free oxygen at a temperature in the range of from about 425° C. to about 650° C. for a time in the range of about 0.1 hours to about 10 hours.

19. A composition in accordance with claim 16 wherein the atomic ratio of zinc to titanium in said absorbing composition is in the range of from about 1:1 to about 3:1.

20. A composition in accordance with claim 19 wherein the atomic ratio of zinc to titanium in said absorbing composition is in the range of from about 1.8:1 to about 2.2:1.

* * * * *